3,416,601
RESIN COMPOSITION AND METHOD OF USE
Bill M. Young and Buddy W. Anderson, Duncan, Okla., assignors to Halliburton Company, Duncan, Okla., a corporation of Delaware
No Drawing. Filed Mar. 28, 1967, Ser. No. 626,413
21 Claims. (Cl. 166—12)

ABSTRACT OF THE DISCLOSURE

The patent describes a catalytically curable composition containing a mixture of diethyl phthalate and dioctyl phthalate which can be hardened to form a porous mass possessing continuous lines of permeability. The hardened mass is useful in many types of filters, in wells, and screening devices.

Background of the invention

This invention relates to several fields of art, including resin compositions, filtering and well-treating and finishing.

In many fields of technology, it is desirable to form a filtering mass or lining in situ. Simply by way of illustration, in well-finishing technology, it is common to pump a material into the annular space between the bore hole and the casing, whereupon the material will harden to form a permeable filter. The permeable filter in this situation functions to permit the passage of formation fluids such as water or oil desired to be recovered from the formation to the casing where it can be pumped to the surface for recovery. At the same time, the filter serves to resist the movement of formation fines and other incompetent formation materials into the casing. The presence of fines in the casing is undesirable, since they may block the casing or damage the pumping and handling equipment. In addition, the transport of fines to the surface represents an undesirable added pumping cost. However, none of the filter-forming materials presently available are true fluid compositions. Rather, the materials are either heavy viscous solid-bearing compositions which provide some permeability upon subsequent washing out of the solids from the hardened mass or depend upon gas evolution for permeability. The solid bearing compositions are difficult to pump and place in the desired location. The gas-evolving materials form many closed cells which are not conducive to permeability. In contrast to these prior procedures, the present invention does provide a thin formulation which is a true easily pumpable solution, and which does not evolve a gas component to achieve permeability. The elimination of the gas generation is of particular importance in well treating because those systems which depend upon gas generation for the formation of pores do not work well under the bottom-hole conditions of pressure and temperature which exist in oil and gas wells. The curable formulations of this invention, upon hardening in place, form masses which contain continuous lines of permeability and yet are capable of bearing load.

Summary

Briefly, the present invention comprises a pumpable liquid composition comprising a catalytically curable organic resin and/or resin-forming components and a liquid organic material comprising diethyl phthalate and dioctyl phthalate, which is suspended throughout the liquid resin before curing. At least some of the liquid organic material is liberated from the resin during curing in the form of discrete lines running through the hardened cured resin mass. The lines of liquid organic material are capable of removal therefrom to provide continuous lines of permeability through the hardened mass. This invention additionally comprises the use of the novel liquid composition to form hardened permeable resins for filtering purposes in wells.

Accordingly, it is the principal object of the present invention to provide a novel pumpable liquid resin composition capable of producing a hardened permeable mass upon curing.

Another object of the present invention is the use of a novel liquid resin composition in wells for sand control, water coning, permeable cementing and the like, to produce a hardened permeable matrix therein which will permit the passage of formation fluids and resist the passage of formation solids.

More particularly, it is an object of the present invention to provide a novel liquid composition capable of producing a hardened permeable matrix upon curing, which is a true fluid composition containing no solids and possessed of a high degree of pumpability.

In another aspect, it is the object of the present invention to provide a novel liquid composition capable of producing a hardened permeable matrix upon curing, containing dispersed therein a mixture of diethyl phthalate and dioctyl phthalate, at least some of which is liberated from the resin during curing and yields continuous lines of permeability upon being flushed from the hardened mass.

These and other objects and advantages of the present invention will be apparent from the more detailed description which follows:

Description of the preferred embodiments

The novel liquid compositions of the present invention are prepared by blending in a liquid curable resin a mixture of diethyl phthalate and dioctyl phthalate as more fully hereinafter described. Typical liquid curable resins suitable for use in this invention are the phenolaldehydes, urea melamines, epoxides, furfuryl alcohol resins, and polyester resins. Mixtures of the above resins may also be utilized. Furfuryl alcohol monomer may also be utilized in combination with the furfuryl alcohol resin.

The organic material dispersed in the liquid curable resin and/or resin-forming monomers prior to curing is one which remains uniformly suspended in the resin during curing, but at least some of which is liberated in the form of discrete lines when the resin begins to cure, so that continuous lines of permeability are promoted throughout the hardened specimens. Thereafter, the material suspended along the continuous lines of permeability is flushed from the pore spaces, leaving the desired hardened permeable mass. The preferred mixture of organic liquid for dispersion in the liquid resin and/or resin-forming materials is one to three parts by volume of dioctyl phthalate to one part by volume of diethyl phthalate. During curing, the dioctyl phthalate is liberated to form the continuous lines of permeability. The diethyl phthalate, for the most part, becomes part of the final set resin. Thus, during the curing operation, the diethyl phthalate is selectively removed from the dioctyl phthalate. The dioctyl phthalate is readily capable of being flushed from the pore spaces after curing has been completed. The resulting product is quite permeable. While not bound by any theory, it is believed that the diethyl phthalate functions in part as a suspending agent for the dioctyl phthalate.

To our knowledge, there has not previously existed a pourable liquid which can be hardened by a catalyst into a porous structure possessing continuous lines of permeability.

It has been found that diethyl phthalate, when used by itself, with furfuryl alcohol resin, does not produce a permeable final product. This is also true for dimethyl phthalate and dibutyl phthalate. When dioctyl phthalate was dispersed in the furfuryl alcohol resin without the benefit of diethyl phthalate, it dropped to the bottom of the test chamber. Therefore, the use of a mixture of diethyl phthalate and dioctyl phthalate is quite critical in the development of continuous lines of permeability in the hardened mass.

The liquid formulations of the present invention are saleable in convenient form, and can, except for the catalyst, be prepackaged. Hence, at the time of use, it is only necessary to add the catalyst, whereupon the material is ready to be pumped into place and permitted to harden. It is important that the catalyst used have at least some affinity for the resin and diethyl phthalate so that it will not be lost to the dioctyl phthalate, which is released to provide permeability. In general, any of the known resin catalysts may be used. Appropriate material for each resin type is already familiar to those skilled in the art, and hence need not be further discussed. Likewise, the amounts used are such as to be sufficient to cure the resin. These effective catalytic amounts normally range from about 1 to 20 parts by volume of curable resin.

The following examples are presented solely to illustrate the invention and should not be regarded as limiting in any way. In the examples, the parts are by volume unless otherwise indicated.

EXAMPLE I

Into about 25 parts by volume of furfuryl alcohol resin (sold under the trade designation Durez–21687 by Hooker Chemical Corporation) was dispersed 15 parts by volume diethyl phthalate, 15 parts by volume dioctyl phthalate, and about four parts by volume of hexachloroacetone (a curing catalyst for the resin). The hardening of this composition can be carried out over a wide range of temperatures and pressures. In this example, one batch as above prepared was cured at 140° F. and one atmosphere, and another batch at 140° F. and about 1500 to 2000 p.s.i. It was observed that upon curing, the dioctyl phthalate was uniformly suspended throughout the cured resin in the form of discrete lines but had not become chemically combined therewith. The thin dioctyl phthalate could be readily flushed from the resin. The permeable mass had a uniform permeability of about 1 to 1.5 darcys.

The composition of this example prior to curing had a viscosity of about 35 to 41 centipoises at 100° F. and hence was readily pumpable. The final hardened mass had a compressive strength of from about 175 p.s.i. to over 400 p.s.i.

The hardened specimens as prepared above, upon exposure to brine for six hours, withstood deterioration. Also, the specimen did not disintegrate when subjected to 200° F. diesel oil for one hour.

The viscosity and working time data on typical compositions are shown on the following table:

TABLE I

| Formula No. | Furfuryl alcohol resin | Diethyl phthalate | Dioctyl phthalate | Viscosity (cps.) at 80° F. | Viscosity (cps.) at 100° F. | Working time |
|---|---|---|---|---|---|---|
| 1 | 20 | 15 | 15 | 78.9 | 35 | 2 hrs. at 140° F. |
| 2 | 30 | 15 | 15 | 100 | 41 | 2 hrs. at 140° F. |

In the above table, the amounts are expressed in parts by volume. In each case, four parts by volume of hexachloroacetone were added to the formulation prior to viscosity and working time measurements.

These properties indicate the suitability of these materials for filtering, in wells, and in many other applications which will be apparent to those skilled in the art.

EXAMPLE II

In this example, the resin used was the polyglycidyl ether of bis-2-(4-hydroxyphenyl) propane. This curable resin is a liquid at room temperature having an epoxide equivalent of from 175 to 210, an average molecular weight of 350–400, and a viscosity of from 5,000 to 15,000 centipoises, at 25° C. This material is available commercially from the Shell Chemical Corporation. The catalyst used was an epoxy liquid polyamine catalyst sold under the trade designation "Catalyst T" by Shell. Formulations were as indicated in the following table:

TABLE II

| Composition No. | Epoxy resin (PBV*) | Diethyl phthalate (PBV*) | Dioctyl phthalate (PBV*) | Catalyst T | Cure Temp. (° F.) | Cure pressure | Compressive strength at 80° F. (p.s.i.) | Permeability in darcys |
|---|---|---|---|---|---|---|---|---|
| 1 | 15 | 5 | 15 | 3 | 140 | 1 atm | 543 | 2.41 |
| 2 | 15 | 5 | 15 | 3 | 140 | 1,500–2,000 p.s.i. | 166 | 5.6 |
| 3 | 16 | 5 | 15 | 3 | 140 | 1 atm | 943 | 3.31 |
| 4 | 16 | 5 | 15 | 3 | 140 | 1,500–2,000 p.s.i. | 682 | 5.6 |
| 5 | 17.5 | 5 | 15 | 3 | 140 | 1 atm | 1,036 | 0.61 |
| 6 | 17.5 | 5 | 15 | 3 | 140 | 1,500–2,000 p.s.i. | 779 | 2.93 |
| 7 | 18.5 | 5 | 15 | 3 | 140 | 1 atm | 1,004 | 0.87 |
| 8 | 18.5 | 5 | 15 | 3 | 140 | 1,500–2,000 p.s.i. | 1,079 | 2.69 |
| 9 | 20 | 5 | 15 | 3 | 140 | 1 atm | 2,500 | 0.33 |
| 10 | 20 | 5 | 15 | 3 | 140 | 1,500–2,000 p.s.i. | 3,607 | 0.21 |

*PBV = Parts by volume.

The cure time in all cases was 18 hours. The formulations prior to curing had viscosities ranging from 26 to 38 centipoises at 104° F. and 200 centipoises to 298 centipoises at 80° F. The masses of the hardened permeable products attained were essentially equivalent to the original liquid volume.

EXAMPLE III

The following table shows additional results obtained in the practice of this invention:

TABLE III

| Formula | Furfuryl alcohol resin (PBV) | Furfuryl alcohol (PBV) | Diethyl phthalate (PBV) | Dioctyl phthalate (PBV) | Hexachloro-acetone (PBV) | Compressive strength, p.s.i. | Permeability, darcys |
|---|---|---|---|---|---|---|---|
| 1 | 20 | 10 | 15 | 25 | 5 | ------ | 0.311 |
| 2 | 30 | 20 | 10 | 30 | 5 | 1,143 | 8.65 |
| 3 | 30 | 20 | 15 | 30 | 15 | 839 | 0.61 |
| 4 | 30 | 20 | 15 | 35 | 5 | 464 | 1.98 |
| 5 | 30 | 20 | 10 | 25 | 5 | 1,000 | 0.26 |
| 6 | 30 | 20 | 10 | 30 | 4 | 1,714 | 13.45 |
| 7 | 20 | 20 | 15 | 30 | 4 | 536 | 0.93 |
| 8 | 20 | 30 | 15 | 30 | 5 | 571 | 0.43 |
| 9 | 20 | 30 | 15 | 35 | 6 | 429 | 0.95 |
| 10 | 25 | 25 | 15 | 30 | 5 | 571 | 0.60 |
| 11 | 25 | 25 | 15 | 35 | 5 | 571 | 1.2 |
| 12 | 25 | 25 | 15 | 25 | 5 | 1,268 | 0.11 |
| 13 | 20 | 20 | 10 | 30 | 4 | 455 | 2.64 |

In the above runs, the curing was conducted at one atmosphere at 140° F.

The foregoing data indicate that excellent results are obtained when the volume ratio in resin to organic material is in the range from about 1 to 1 or 1 to 1.5.

The permeable masses produced by the present invention have many uses. The liquid composition can be placed down the tubing, behind the casing, into voids or cavities. After the excess has circulated out of the bore hole with an immiscible fluid, a hardened resin forms under the influence of the catalyst. The lines of organic material are flushed, e.g., by water, to leave a permeable sheath capable of retaining any migratory solids, while permitting fluid production. Sand control in open hole completions and long intervals are also within the scope of this invention. For example, the bore hole across the producing strata may be filled with resin until it is hardened. Then the same can be drilled out prior to initiating production.

Water coning may be controlled by promoting "oil wet" properties to formation regions, thereby hindering the flow of water because of high surface tension. Formation fracturing represents another use for the novel formulations of this invention.

The resin formulation of the present invention can also be used to cement perforated liners and casings in place, that is, in situations where a permeable sheath is needed behind the metal transversements.

The application of the permeable hardened masses also includes areas outside of well bores. For example, the permeable plastic can be utilized for insulation purposes, filters and the like.

The other uses for the permeable compositions of the present invention include gasoline, diesel oil, water, air, oil filters for all types of engines, compressors and flow lines, acid and alkali filters involving resin systems such as application in chemical disposable wells, water well filters of varying permeabilities (above ground and in well types), aerator devices, filters moldable and placed to suit a regularly shaped sewage and irrigation line, drain flowing from car-wash houses, service stations, refrigerator cars or other areas where floors are desired which permit fluid drainage and yet offer a reasonably dry surface at all times, construction outlays desiring water runoff with retention of soil, sand screening devices for oil and gas wells, and insulation uses where a pourable composition is particularly advantageous.

Having fully described the invention, it is intended that it be limited only by the lawful scope of the appended claims.

We claim:

1. A liquid composition comprising (1) a catalytically curable organic material selected from the group consisting of resin, resin-forming monomer, and mixtures thereof, and (2) a liquid organic material suspended therein, comprising diethyl phthalate and dioctyl phthalate, said composition, upon curing, yielding a hardened cured resin having discrete lines of the liquid organic material running therethrough which can be removed therefrom to provide continuous lines of permeability.

2. The composition of claim 1 wherein one to three parts by volume of dioctyl phthalate is used with one part by volume of diethyl phthalate.

3. The composition of claim 1 wherein the curable material is an epoxide resin.

4. The composition of claim 1 wherein the curable material is a furfuryl alcohol resin.

5. The composition of claim 1 wherein the curable material is a furfuryl alcohol resin containing furfuryl alcohol as a component thereof.

6. The composition of claim 1 containing an effective catalytic amount of a compatible resin catalyst.

7. A hardened resin mass suitable for filtering, containing continuous lines of permeability prepared by curing a liquid composition comprising (1) a catalytically curable organic material selected from the group consisting of resin, resin-forming monomers, and mixtures thereof and (2) a liquid organic material suspended therein comprising diethyl phthalate and dioctyl phthalate and flushing from the cured resin the discrete lines of liquid organic material liberated during curing.

8. The composition of claim 7 wherein one to three parts by volume of dioctyl phthalate is used with one part by volume of diethyl phthalate.

9. The composition of claim 7 wherein the curable material is an epoxide resin.

10. The composition of claim 7 wherein the curable material is a furfuryl alcohol resin.

11. The composition of claim 7 wherein the curable material is a furfuryl alcohol resin containing furfuryl alcohol as a component thereof.

12. The method for the control of the movement of formation fines present around a bore hole transversing a producing zone from the formation into the bore hole which comprises injecting into the bore hole in the vicinity of the producing zone, a liquid pumpable composition comprising a catalytically curable organic resin, a liquid organic material suspended therein comprising diethyl phthalate and dioctyl phthalate, and a catalyst for said resin, permitting said resin to harden in place to form a hardened resin mass having discrete lines of the liquid organic material running therethrough, and removing said discrete lines by flushing to provide a filter sheath containing continuous lines of permeability capable of resisting the passage of formation fines into said zone while permitting the passage of formation liquids.

13. The method of claim 12 wherein one to three parts by volume of dioctyl phthalate is used with one part by volume of diethyl phthalate.

14. The method of claim 12 wherein the curable resin is an epoxide resin.

15. The method of claim 12 wherein the curable resin is a furfuryl alcohol resin.

16. The method of claim 12 wherein the curable resin is a furfuryl alcohol resin containing furfuryl alcohol as a component thereof.

17. The method of making a permeable plastic which comprises forming a liquid composition comprising a catalytically curable organic resin, a liquid organic material suspended therein comprising diethyl phthalate and dioctyl phthalate, and a catalyst for said resin, permitting said resin to harden to form a hardened resin mass having discrete lines of the liquid organic material running therethrough and removing said discrete lines by flushing to form a plastic mass containing continuous lines of permeability.

18. The method of claim 17 wherein one to three parts by volume of dioctyl phthalate is used with one part by volume of diethyl phthalate.

19. The method of claim 17 wherein the curable resin is an epoxide resin.

20. The method of claim 17 wherein the curable resin is a furfuryl alcohol resin.

21. The method of claim 17 wherein the curable resin is a furfuryl alcohol resin containing furfuryl alcohol as a component thereof.

References Cited

UNITED STATES PATENTS

| | | |
|---|---|---|
| 2,539,207 | 1/1951 | Safford. |
| 2,611,750 | 9/1952 | White _____ 210—510 |
| 2,646,414 | 7/1953 | Gillespie. |
| 2,671,769 | 3/1954 | Cowell. |
| 2,674,323 | 4/1954 | Cardwell _____ 166—12 |
| 2,894,920 | 7/1959 | Ramos. |

CHARLES E. O'CONNELL, *Primary Examiner.*

I. A. CALVERT, *Assistant Examiner.*

U.S. Cl. X.R.

166—33; 210—510; 260—2.5, 31.8